(12) United States Patent
Larson et al.

(10) Patent No.: US 8,416,152 B2
(45) Date of Patent: Apr. 9, 2013

(54) METHOD AND SYSTEM FOR OPERATING A NEAR-TO-EYE DISPLAY

(75) Inventors: Brent D. Larson, Cave Creek, AZ (US); John G. Suddreth, Cave Creek, AZ (US); Frank Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1113 days.

(21) Appl. No.: 12/137,271

(22) Filed: Jun. 11, 2008

(65) Prior Publication Data

US 2009/0309812 A1 Dec. 17, 2009

(51) Int. Cl.
*G02B 27/00* (2006.01)
*G09G 5/00* (2006.01)

(52) U.S. Cl. .............................................. 345/8; 701/3
(58) Field of Classification Search ........... 345/8; 701/3
See application file for complete search history.

(56) References Cited

U.S. PATENT DOCUMENTS

| | | | |
|---|---|---|---|
| 5,079,416 A * | 1/1992 | Filipovich ............... 250/214 VT |
| 5,224,198 A * | 6/1993 | Jachimowicz et al. ....... 385/133 |
| 5,281,960 A * | 1/1994 | Dwyer, III ...................... 345/31 |
| 5,566,073 A | 10/1996 | Margolin |
| 5,917,460 A * | 6/1999 | Kodama ............................. 345/8 |
| 5,991,085 A * | 11/1999 | Rallison et al. ................ 359/630 |
| 7,180,476 B1 | 2/2007 | Guell et al. |
| 7,599,765 B2 * | 10/2009 | Padan ................................ 701/3 |
| 7,627,190 B1 * | 12/2009 | Repperger et al. ............. 382/254 |
| 7,893,890 B2 * | 2/2011 | Kelly et al. ......................... 345/8 |
| 8,026,834 B2 * | 9/2011 | Larson et al. ................. 340/980 |
| 2002/0140667 A1 * | 10/2002 | Horiki ............................ 345/156 |
| 2003/0030597 A1 * | 2/2003 | Geist ................................. 345/8 |
| 2005/0099433 A1 * | 5/2005 | Berson et al. ................. 345/619 |
| 2006/0055628 A1 | 3/2006 | Sanders-Reed et al. |
| 2006/0256140 A1 * | 11/2006 | Turner .......................... 345/690 |

FOREIGN PATENT DOCUMENTS

| | | |
|---|---|---|
| EP | 0330147 A2 | 8/1989 |
| EP | 0330184 A2 | 8/1989 |
| GB | 2259213 A | 3/1993 |
| JP | 2007302116 | 11/2007 |

OTHER PUBLICATIONS

EP Communication, EP 09162125.0-1524 dated Jan. 31, 2012.
EP Search Report dated Aug. 10, 2009, EP 09162125.0-1524.

* cited by examiner

*Primary Examiner* — Quan-Zhen Wang
*Assistant Examiner* — Michael J Eurice
(74) *Attorney, Agent, or Firm* — Ingrassia Fisher & Lorenz, P.C.

(57) ABSTRACT

Methods and systems for operating a vehicular near-to-eye (NTE) display screen operable within an operational range limit are provided. An image is rendering on the NTE display screen within a predefined visibility range. The predefined visibility range is within the operational range limit. A luminance of at least a portion of the image is reduced in response to the NTE display screen being moved outside of the predefined visibility range and within the operational range limit.

20 Claims, 11 Drawing Sheets

METHOD AND SYSTEM FOR OPERATING A NEAR-TO-EYE DISPLAY

TECHNICAL FIELD

The present invention generally relates to head-up displays (HUDs), and more particularly relates to methods and systems for operating near-to-eye (NTE) displays.

BACKGROUND

Modern vehicles, such as aircraft, often include head-up displays (HUDs) that project various symbols and information onto a transparent display, or image combiner, through which a user (e.g., the pilot) may simultaneously view the exterior. Traditional HUDs incorporate fixed image combiners located above the instrument panel on the windshield of the aircraft, or directly between the windshield and the pilot's head.

"Head-mounted" HUDs have been developed that utilize image combiners, such as near-to-eye (NTE) displays, coupled to the helmet or headset of the pilot that move with the changing position and angular orientation of the pilot's head. Although an advantage of head-mounted HUDs is that the information displayed may be visible to the pilot regardless of the position or orientation of his or her head, there may circumstances in which the pilot would prefer that the information on the NTE display not be visible, such as when the pilot is attempting to view the terrain with as little visible obstruction as possible, or when the pilot is viewing a display on the instrument panel (i.e., a "head-down" display).

In this sense, traditional HUDS utilizing fixed image combiners offer the advantage that the information displayed is typically only visible when the pilot's head is directly in front of the image combiner. That is, if the pilot leans to the side to look around the image combiner, or looks down at the instrument panel, the information on the HUD is no longer visible.

Accordingly, it is desirable to provide a method and system for operating a NTE display in such a way to improve the user's control over when the information is displayed. Furthermore, other desirable features and characteristics of the present invention will become apparent from the subsequent detailed description of the invention and the appended claims, taken in conjunction with the accompanying drawings and this background of the invention.

BRIEF SUMMARY

A method for operating a vehicular near-to-eye (NTE) display screen operable within an operational range limit is provided. An image is rendering on the NTE display screen within a predefined visibility range. The predefined visibility range is within the operational range limit. A luminance of at least a portion of the image is reduced in response to the NTE display screen being moved outside of the predefined visibility range and within the operational range limit.

A method for operating a near-to-eye (NTE) display screen operable within an operational range limit on-board an aircraft is provided. A first image is caused to be rendered on the NTE display screen within a predefined visibility range. The first image is at least representative of a field of view of a user on-board the aircraft, and the predefined visibility range is within the operational range limit and a function of at least three degrees of freedom. A second image is rendered over the first image on the NTE display screen. A luminance of at least a portion of the second image is reduced in response to the NTE display screen being moved outside of the predefined visibility range and within the operational range limit.

An avionics system is provided. The avionics system includes a headset, a tracking system, and a processor. The headset is configured to be worn on a head of a user and includes a frame and a near-to-eye (NTE) display adjustably coupled to the frame to be positioned proximate to an eye of the user. The NTE display is operable within an operational range limit on-board an aircraft. The tracking system is configured to detect at least one of a position and an angular orientation of the NTE display. The processor is in operable communication with the NTE display and the tracking system. The processor is configured to render an image on the NTE display screen within the predefined visibility range, the predefined visibility range being within the operational range limit, and reduce a luminance of at least a portion of the image in response to the NTE display screen being moved outside of the predefined visibility range and within the operational range limit.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-11 are merely illustrative and may not be drawn to scale. Additionally, in several of the drawings, a Cartesian coordinate system, including x, y, and z axes and/or directions, is shown to clarify the relative position and/or orientation of the components, according to the various embodiments. However, this coordinate system is only intended to assist in the explanation of various aspects of the present invention, and should be not construed as limiting.

FIG. 1 to FIG. 11 illustrate a method and system for operating a vehicular near-to-eye (NTE) display screen. The NTE display is operable within an operational range limit, such as a flight deck on an aircraft. An image is rendered on the NTE display screen within a predefined visibility range which is defined by, for example, a range of positions and/or angular orientations of the NTE display (or a headset to which the NTE display is coupled) within the operational range limit. The image is dimmed, or removed from the NTE display completely, in response to the NTE display screen (and/or the headset) being moved outside of the predefined visibility range while still being within the operational range limit.

Figure 1:
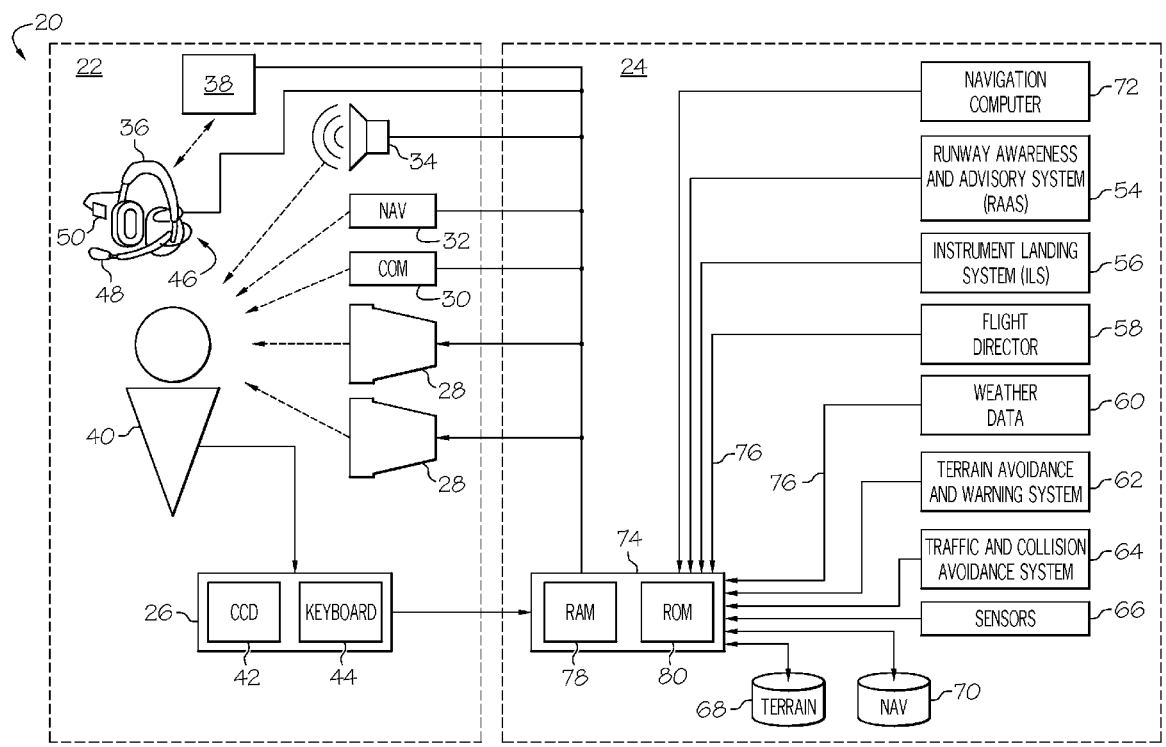
FIG. 1 is a schematic block diagram of an aircraft, according to one embodiment of the present invention.

FIG. 1 schematically illustrates a vehicle 20, such as an aircraft, according to one embodiment of the present invention. The vehicle 20 may be, in one embodiment, any one of a number of different types of aircraft such as, for example, a private propeller or jet engine driven airplane, a commercial jet liner, or a helicopter. In the depicted embodiment, the vehicle 20 includes a flight deck 22 (or cockpit) and an avionics/flight system 24. Although not specifically illustrated, it should be understood that the vehicle 20 also includes a frame or body to which the flight deck 22 and the avionics/flight system 24 are connected, as is commonly understood. It should also be noted that vehicle 20 is merely exemplary and could be implemented without one or more of the depicted components, systems, and data sources. It will additionally be appreciated that the vehicle 20 could be implemented with one or more additional components, systems, or data sources.

The flight deck 22 includes a user interface 26, display devices 28 (e.g., a primary flight display (PFD)), a communications radio 30, a navigational radio 32, an audio device 34, a headset 36, and a head (and/or eye) motion tracker 38.

The user interface 26 is configured to receive input from a user 40 (e.g., a pilot) and, in response to user input, supply command signals to the avionics/flight system 24. The user interface 26 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 26 includes a CCD 42 and a keyboard 44. The user 40 uses the CCD 42 to, for example, move a cursor symbol on the display devices 28, and use the keyboard 44 to, for example, input textual data.

Still referring to FIG. 1, the display devices 28 are used to display various images and data, in graphic, iconic, and/or textual formats, and to supply visual feedback to the user 40 in response to the user input commands supplied by the user 40 to the user interface 26. It will be appreciated that the display devices 28 may each be implemented using any one of numerous known displays suitable for rendering image and/or text data in a format viewable by the user 40, such as a cathode ray tube (CRT) displays, a LCD (liquid crystal display), or a TFT (thin film transistor) displays. The display devices 28 may also be implemented on the flight deck 22 as "head-down" displays or a head-up display (HUD) projection on a fixed image combiner.

The communication radio 30 is used, as is commonly understood, to communicate with entities outside the vehicle 20, such as air-traffic controllers and pilots of other aircraft. The navigational radio 32 is used to receive from outside sources and communicate to the user various types of information regarding the location of the vehicle, such as Global Positioning Satellite (GPS) system and Automatic Direction Finder (ADF) (as described below). The audio device 34 is, in one embodiment, an audio speaker mounted within the flight deck 22.

The headset 36 includes an interconnected combination of earphones 46, a microphone 48, and a near-to-eye (NTE) display (or display screen) 50. The earphones 46 may substantially form a frame for the headset 36 and be configured to be removably worn by the pilot. The earphones 46 and the microphone 48 may be in operable communication with the communications radio 30, and the NTE display may be in operable communication with the avionics system 24, as described below. The NTE display 50 may be adjustably suspended from the earphones 46 such that the display 50 may positioned directly in front of an eye of the user 40 while the headset 36 is worn, as is commonly understood. In one embodiment, the NTE display 50 is an image combiner (i.e., a substantially transparent plate), as is commonly understood. The NTE display 50 may also be, for example, a flat panel display screen, such as an LCD display screen. Although not shown, the headset 36 may also include an eye motion detector to detect movement of the eye of the user relative to the user's head. Additionally, the headset 36 may include various hardware, such as inertial sensors, to detect movements of the user's head. It should also be noted that the flight deck 22 may define an "operational range limit" of the headset 36, and in particular, of the NTE display 50. That is, the headset 36 and the NTE display 50 may not be able to operate properly and/or communicate the other components of the aircraft 20 if removed from the operational range limit (e.g., because the headset becomes "unplugged.")

Figure 2:
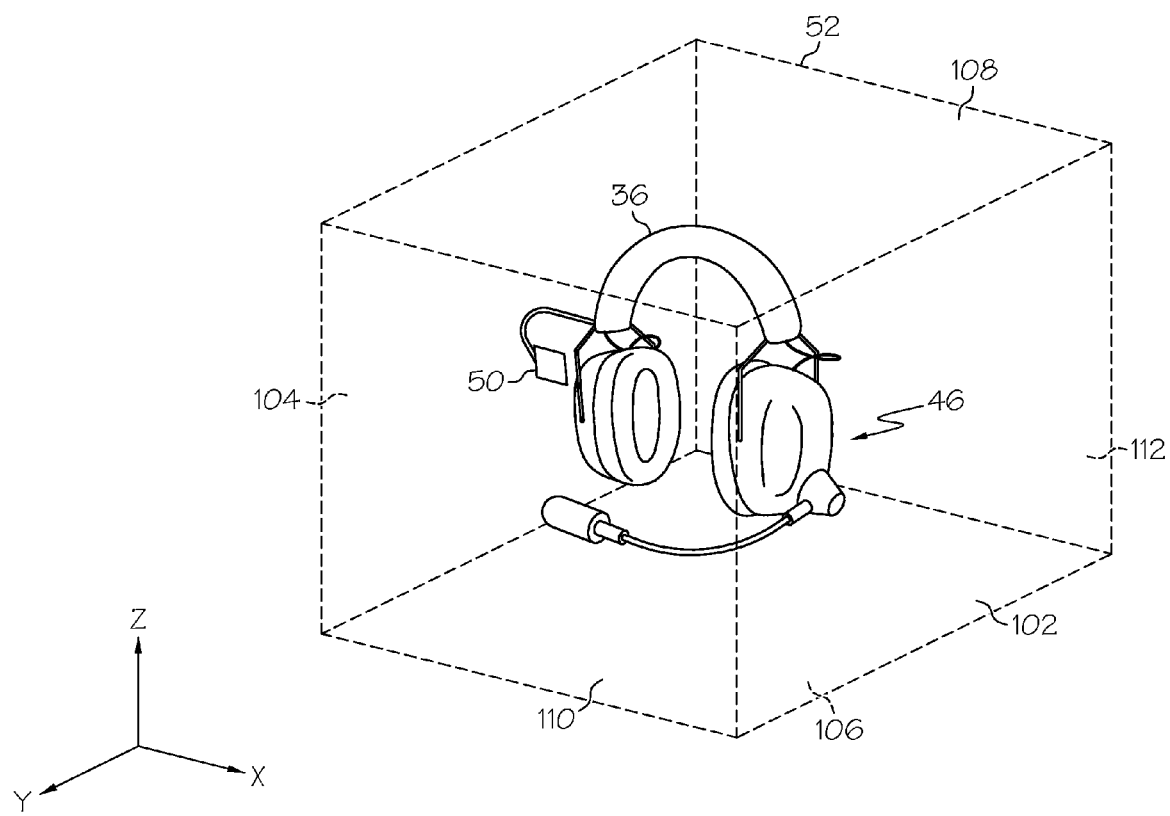
FIG. 2 is an isometric view of a headset on-board the aircraft of FIG. 1, including a near-to-eye (NTE) display, centered within a predetermined visibility range.

The motion tracker 38 is configured to detect (either solely or in combination with the hardware in the headset 36) movements (i.e., position and angular orientation) of the pilot's head, the headset 36 as a whole, and/or the NTE display 50. Although not shown, the motion tracker 38 may utilize various methods to determine the movements including optical and/or infrared components and inertial sensors located within the headset 36. Referring to FIGS. 1 and 2, the motion tracker 38 and/or the headset 36 (and/or the processor described below) define a "predetermined visibility range" (or eye-motion box) 52 located on the flight deck 22. Although shown as a cubic volume, the visibility range 52 corresponds to both a spatial and angular position of the headset 36 and/or the NTE display 50 relative to the Cartesian coordinate system shown. That is, the visibility range 52 defines a range of positions along the x, y, and z-axes shown and/or a range of angular orientations about the x, y, and z-axes (i.e., six degrees of freedom) which is used to control the NTE display 50, as described in greater detail below.

As shown in FIG. 1, the avionics/flight system 24 includes a runway awareness and advisory system (RAAS) 54, an instrument landing system (ILS) 56, a flight director 58, a weather data source 60, a terrain avoidance warning system (TAWS) 62, a traffic and collision avoidance system (TCAS) 64, a plurality of sensors 66 (e.g., a barometric pressure sensor, a thermometer, and a wind speed sensor), one or more terrain databases 68, one or more navigation databases 70, a navigation and control system (or navigation computer) 72, and a processor 74. The various components of the avionics/flight system 24 are in operable communication via a data bus 76 (or avionics bus). Although not illustrated, the navigation and control system 72 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor 74 may be any one of numerous known general-purpose controller or an application specific processor that operates in response to program instructions, such as field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 78 and on-board ROM (read only memory) 80. The program instructions that control the processor 74 may be stored in either or both the RAM 78 and the ROM 80. For example, the operating system software may be stored in the ROM 80, whereas various operating mode software routines and various operational parameters may be stored in the RAM 78. The RAM 78 and/or the ROM 80 may include instructions stored thereon for carrying out the methods and processes described below. It will be appreciated that this is merely exemplary of one scheme for storing operating system software and software routines, and that various other storage schemes may be implemented. It will also be appreciated that the processor 74 may be implemented using various other circuits, not just a programmable processor. For example, digital logic circuits and analog signal processing circuits could also be used.

During operation of the aircraft 20, the headset 36 is worn by the pilot 40 (or other user), and the earphones 46 and the microphone 48 are used to communicate with ground personnel, as well as other aircraft. Additionally, the NTE display 50 is adjusted such that it is positioned directly in front of one of the user's 40 eyes.

Figure 3:
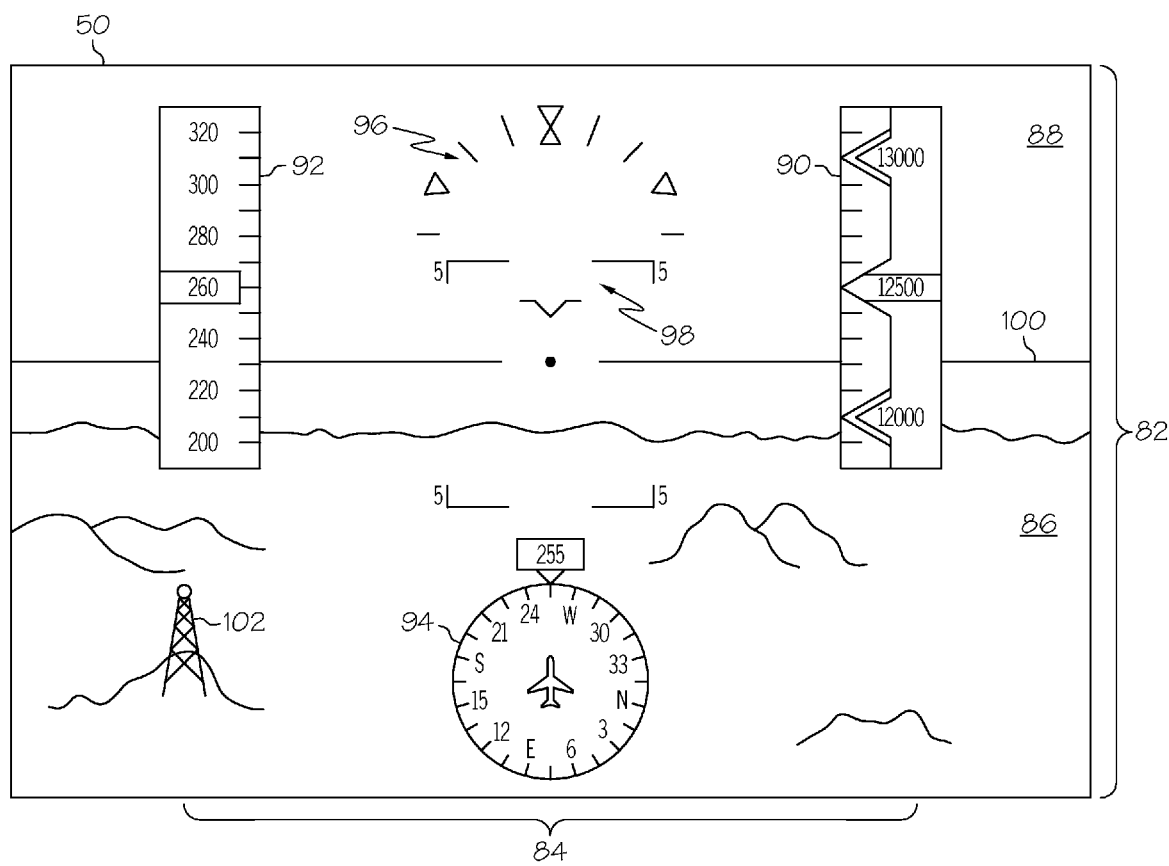
FIG. 3 is a plan view of the NTE display with a symbology image rendered thereon.

FIG. 3 illustrates the NTE display 50 during operation. On the NTE display 50 are shown a terrain image 82 and a symbology image (or simply "symbology") 84. The terrain image 82 is at least representative of the pilot's view from the flight deck 22. In the exemplary embodiment shown in FIG. 3, the terrain image 82 depicts a perspective view from the aircraft 20 of the terrain outside the aircraft 20 and covers substantially the entire display 50. The terrain image 82 includes a terrain portion 86 and a sky portion 88. As is commonly understood, in an embodiment in which the display 50 is an image combiner, the terrain image 82 is simply the pilot's 40 view of the terrain (and/or the interior of the flight deck 22) as seen through the NTE display 50. While, in an embodiment in which the NTE display 50 is, for example, an LCD display, the terrain image 82 is generated based on multiple readings from various instruments onboard the aircraft 20 that provide a current position and/or orientation (e.g., heading) of the aircraft 20 and changes as the position and/or orientation of the aircraft 20 changes, as well as the terrain and navigational databases 68 and 70 (FIG. 1). As indicated on FIG. 3, terrain features (e.g., hills, mountains, valleys, etc.) may be shown on the terrain image 82 to assist the user 40 with the operation of the aircraft 20.

Still referring to FIG. 3, the symbology 84 is displayed over terrain image 100. The symbology 84 includes multiple digital instruments, such as an altitude indicator 90, an airspeed indicator 92, a heading indicator 94, a roll indicator 96, and a pitch indicator 98. In the embodiment illustrated, the altitude indicator 90 and the airspeed indicator 92 are displayed as an altitude "tape" and an airspeed tape, respectively, as is commonly understood. The heading indicator 94 is graphically displayed as a compass at a lower center portion of the display 50. The roll indicator 96 is displayed above the heading indicator 94 at an upper portion of the display 50, and the pitch indicator 98 is positioned between the heading indicator 94 and the roll indicator 96. The digital instruments 90-98 provide an indication of a position and/or orientation (i.e., heading, pitch, roll, etc.) of the aircraft 20 to the user 40. As shown, the NTE display 50 also includes a horizon bar 100, which may be considered to be part of either the terrain image 82 or the symbology image 84, or alternately part of neither. The horizon bar 100 extends horizontally near the center of the screen 50, through the pitch indicator 98.

In one embodiment, portions of the symbology image 84 are partially (or completely) dimmed based on the position and/or orientation of the NTE display 50 (and/or the headset 36) relative to the predetermined visibility range 52. FIG. 2 illustrates the headset 36 (along with the NTE display 50) positioned, both spatially and angularly, approximately in the center of the visibility range 52 (e.g., with the pilot's head centered above the pilot's seat and facing directly towards the front of the aircraft 20). As described briefly above, although the visibility range 52 is shown as a substantially cubic volume, it may represent both a spatial and/or an angular range for the operation of the NTE display 50, according to one embodiment of the present invention. As such, the visibility range 52 has first and second lateral limits 102 and 104 and first and second vertical limits 106 and 108, as well as a forward limit 110 and a backward limit 112. Each pair of limits lies on opposing sides (or extrema) of the respective degree(s) of freedom. In an embodiment in which spatial limits are used, the visibility range 52 is a cubic space having dimensions of, for example, 4×8×12 inches. In one embodiment, when the headset 36 is centered as shown in FIG. 2, the entire symbology image 84 is rendered on the NTE display 50 as shown in FIG. 3.

Figure 4:
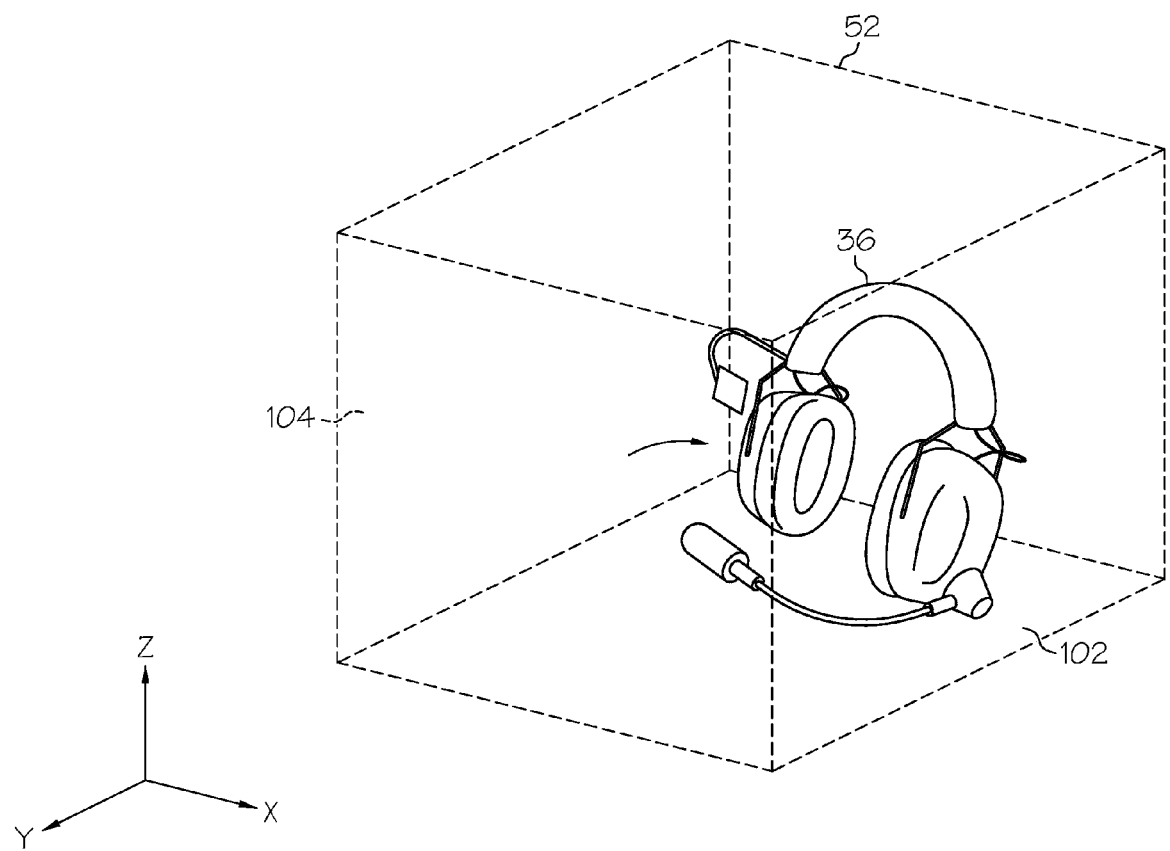
FIG. 4 is an isometric view of the headset moved towards a side of the visibility range.
Figure 5:
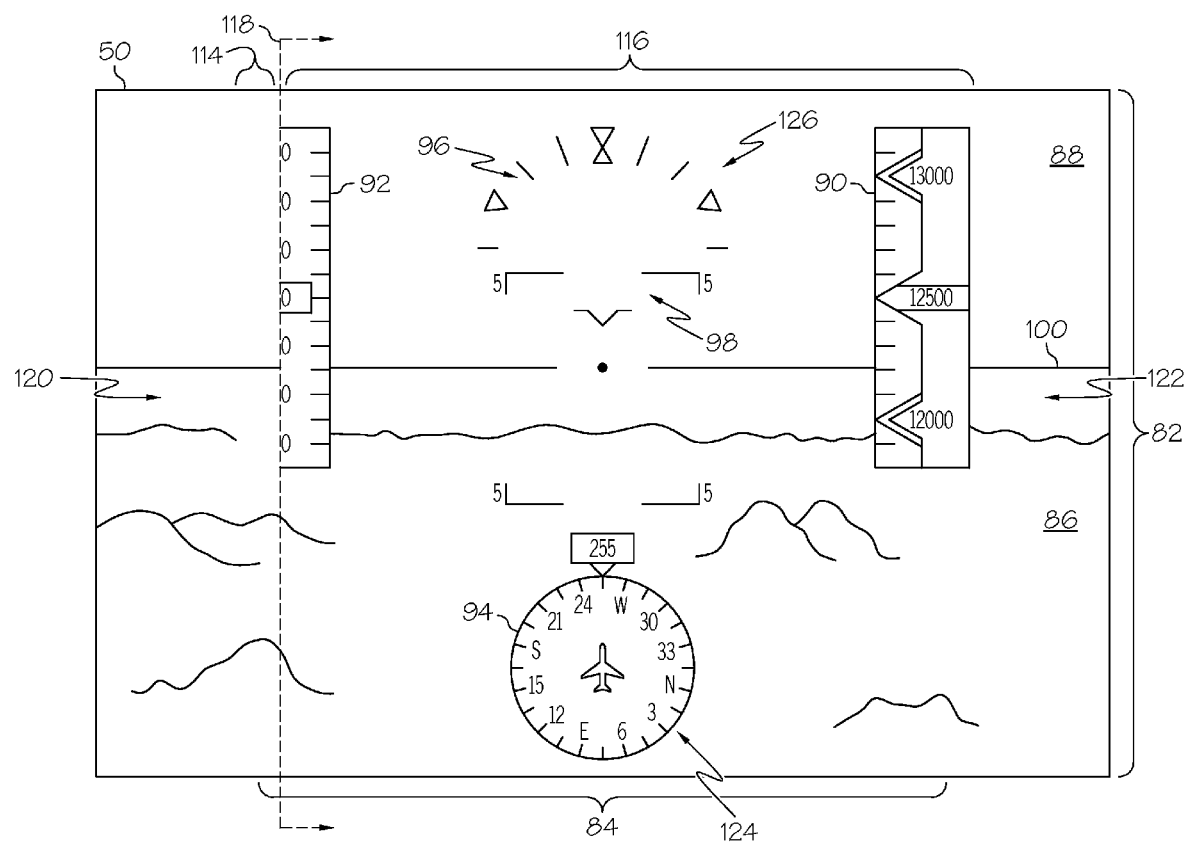
FIG. 5 is a plan view of the NTE display with a portion of the symbology image dimmed.

FIG. 4 illustrates the headset 36 moved along the x-axis towards the first lateral limit 102 of the visibility range 52, as well as rotated about the y-axis towards the first lateral limit 102. Referring to FIG. 5, as the headset 36 approaches the first lateral limit 102, the symbology image 84 is laterally divided into a first portion 114 and a second portion 116 by, for illustrative purposes, dashed line 118. The first portion 114 is adjacent to a first side 120 of the symbology image 84, and the second portion 116 is adjacent to a second side 122 of the symbology image 84. As shown, the first portion 114 of the symbology image 84 (excluding the horizon bar 100) is partially reduced in luminance (or removed completely), despite the fact that the NTE display 50 is still within the operational range limit (i.e., the flight deck 22 shown on FIG. 1).

Figure 6:
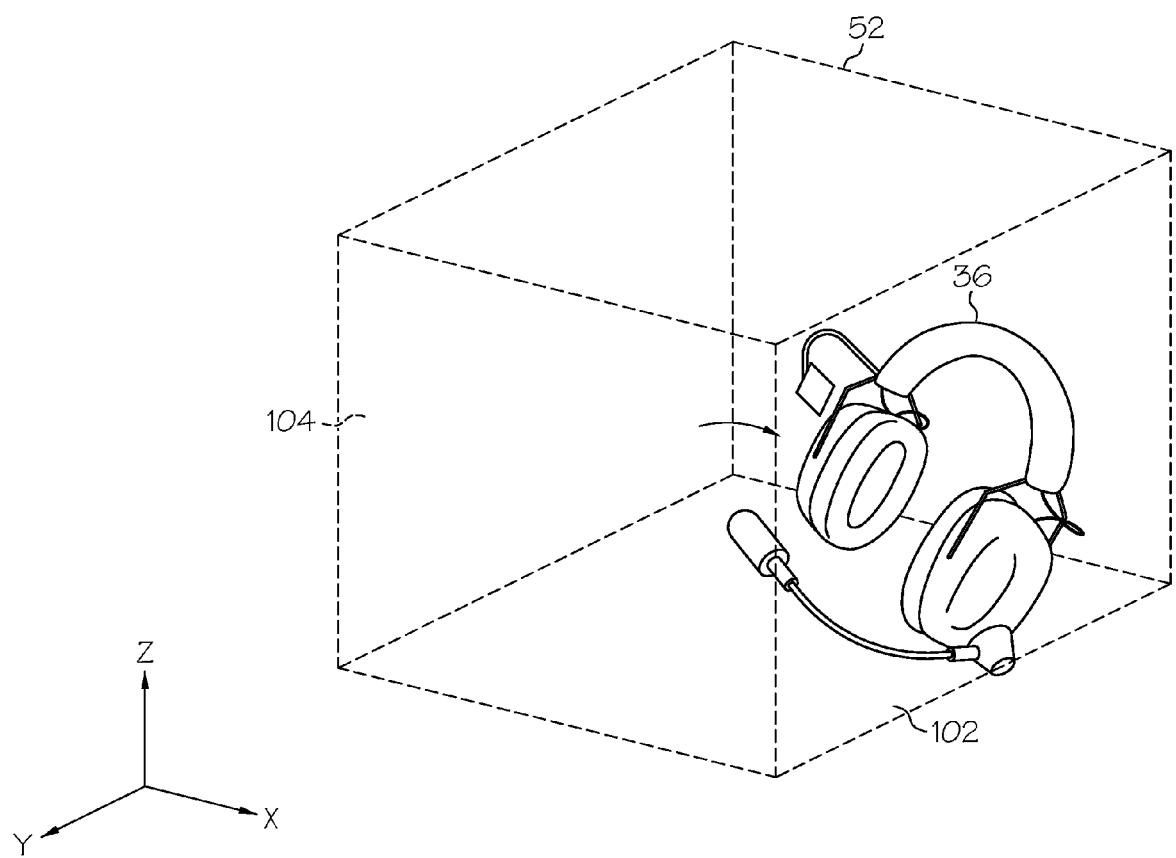
FIG. 6 is an isometric view of the headset moved farther towards the side of the visibility range.
Figure 7:
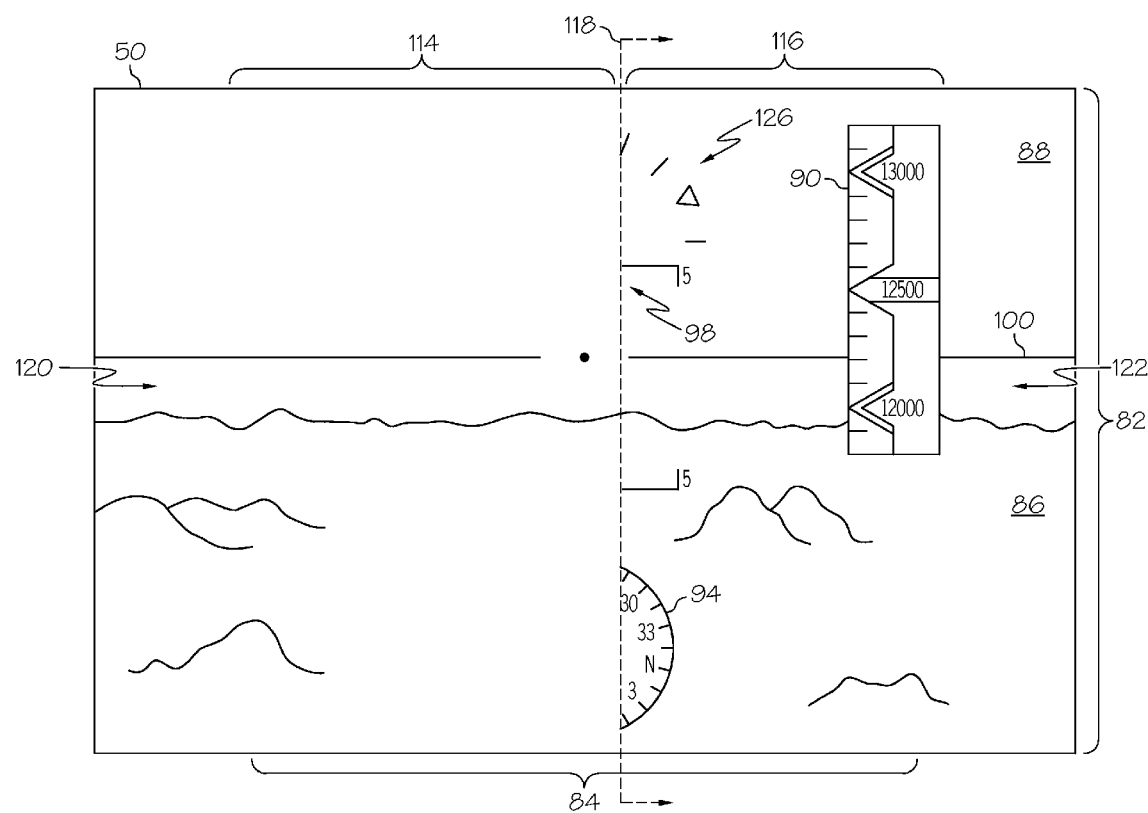
FIG. 7 is a plan view of the NTE display with an increased portion of the symbology image dimmed.
Figure 8:
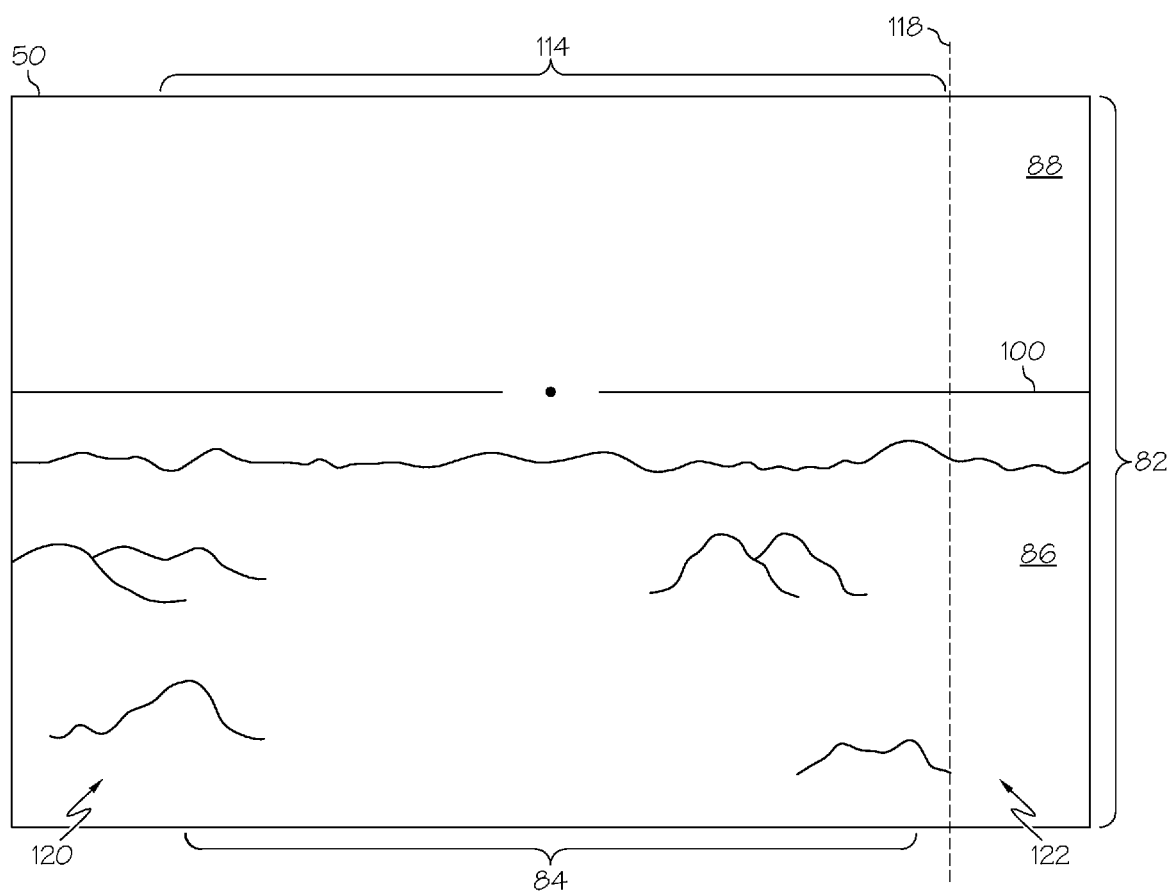
FIG. 8 is a plan view of the NTE display with the entire symbology image dimmed.

FIG. 6 illustrates the headset 36 moved farther towards (and/or through) the first lateral limit 102 of the visibility range 52. Referring to FIG. 7, as the headset 36 is moved farther towards the first lateral limit 102 of the visibility range 52, the dashed line 118 traverses the NTE display 50 from the first side 120 of the symbology range 84 towards to the second side 122 of the symbology image 84. As such, the first portion 114 of the symbology image 84 has increased in size, while the second portion 116 has decreased in size. Thus, the portion of the symbology image 84 that has been dimmed (or completely removed) has increased. FIG. 8 illustrates the NTE display 50 with the headset 36 (and/or the NTE display 50) moved completely through, or nearly completely through, the first lateral limit 102 of the visibility range 52. As shown, the dashed line 118 has moved across the NTE display 50 to the second side 122 of the symbology 84. As such, the second portion 116 of the symbology image 84 has been completely removed, or nearly completely removed. In one embodiment, when the lateral limit 102 has been exceeded, only the first portion 114 of the symbology image 84 remains and occupies the NTE display 50. As a result, the entire symbology image 84 has been dimmed (or removed) such that the pilot may view the terrain image 82 and/or the interior of the flight deck 12 with no visible obstruction from the symbology image 84.

Figure 9:
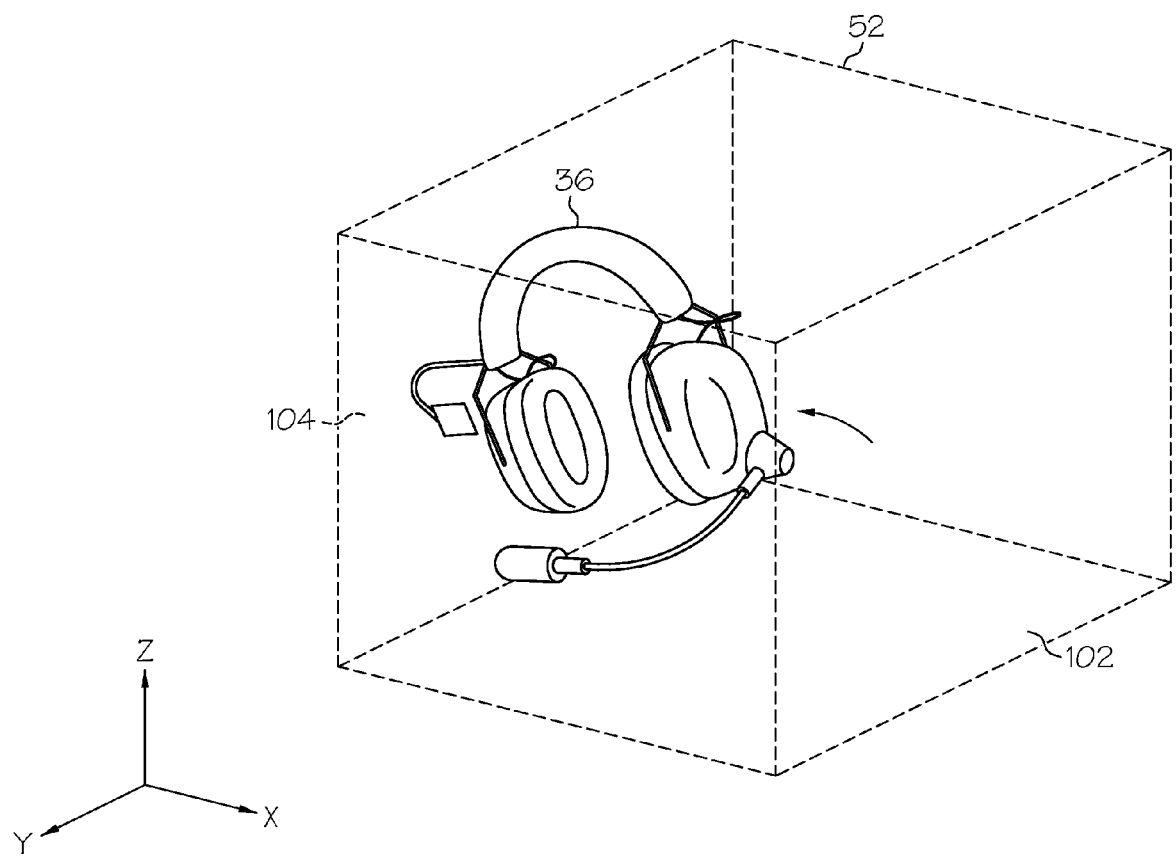
FIG. 9 is an isometric view of the headset moved towards an opposing side of the visibility range.
Figure 10:
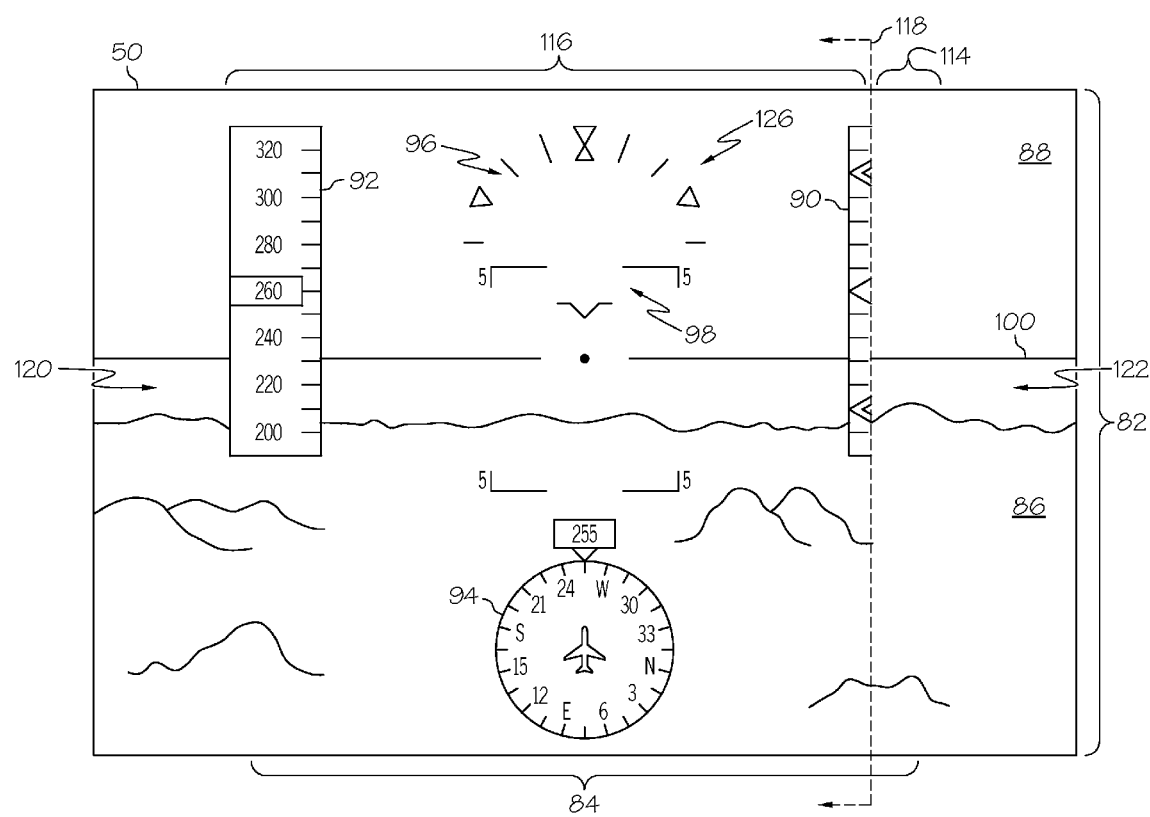
FIG. 10 is a plan view of the NTE display with a portion of the symbology image dimmed.

FIG. 9 illustrates the headset 36 moved along the x-axis towards the second lateral limit 104 of the visibility range 52, as well as rotated about the y-axis towards the second lateral limit 104. Referring to FIG. 10, as the headset 36 approaches the second lateral limit 104, the symbology image 84 is again laterally divided into the first portion 114 and the second portion 116 by the dashed line 118. However, the first portion 114 is now adjacent to the second side 122 of the symbology image 84, and the second portion 116 is adjacent to the first side 120 of the symbology image 84. Again, the first portion 114 of the symbology image 84 is partially dimmed (or erased completely). As the headset 36 is moved farther towards and/or through the second lateral limit 104, the dashed line 118 traverses across the NTE display 50 towards the first side 120 of the symbology image 84 in a manner similar to that described above.

Thus, the orientation of the dashed line 118 and the direction in which the dashed line 118 traverses the NTE display 50 is dependent upon the direction in which the headset 36 and/or the NTE display 50 is moved within the visibility range 52. As another example, although not specifically shown, the dashed line 118 may divide the symbology image 84 in portions other than lateral portions. That is, if the headset 36 is moved spatially and/or angularly downwards to (or through) the first vertical limit 106 (FIG. 2), the dashed line 118 may extend horizontally across the NTE display 50 to divide the symbology image 84 into vertical portions such that the symbology image 84 is dimmed (or removed) from a bottom side 124 of the symbology image 84 to a top side 126 of the symbology image 84 (FIG. 5). Likewise, if the headset 36 is moved spatially and/or angularly upwards to (or through) the second vertical limit 108 (FIG. 2), the dashed line 118 may extend horizontally across the NTE display 50 and the symbology image 84 may be dimmed (or removed) from the top side 126 to the bottom side 124 of the symbology image 84.

Again, it should also be understood, as described above, that the visibility range 52 as defined by the motion tracker 38 and/or the headset 36 may operate as both a function of the position of the headset 36, as well as the angular orientation of the headset 36. As such, only angular movement of the headset 36 may be necessary to cause the symbology image 84 to be dimmed or completely removed. For example, if the headset is rotated (e.g., 10-90 degrees) downwards about the x-axis, without changing spatial position within the visibility range 52, the symbology image 84 may be completely removed as shown in FIG. 8.

Figure 11:
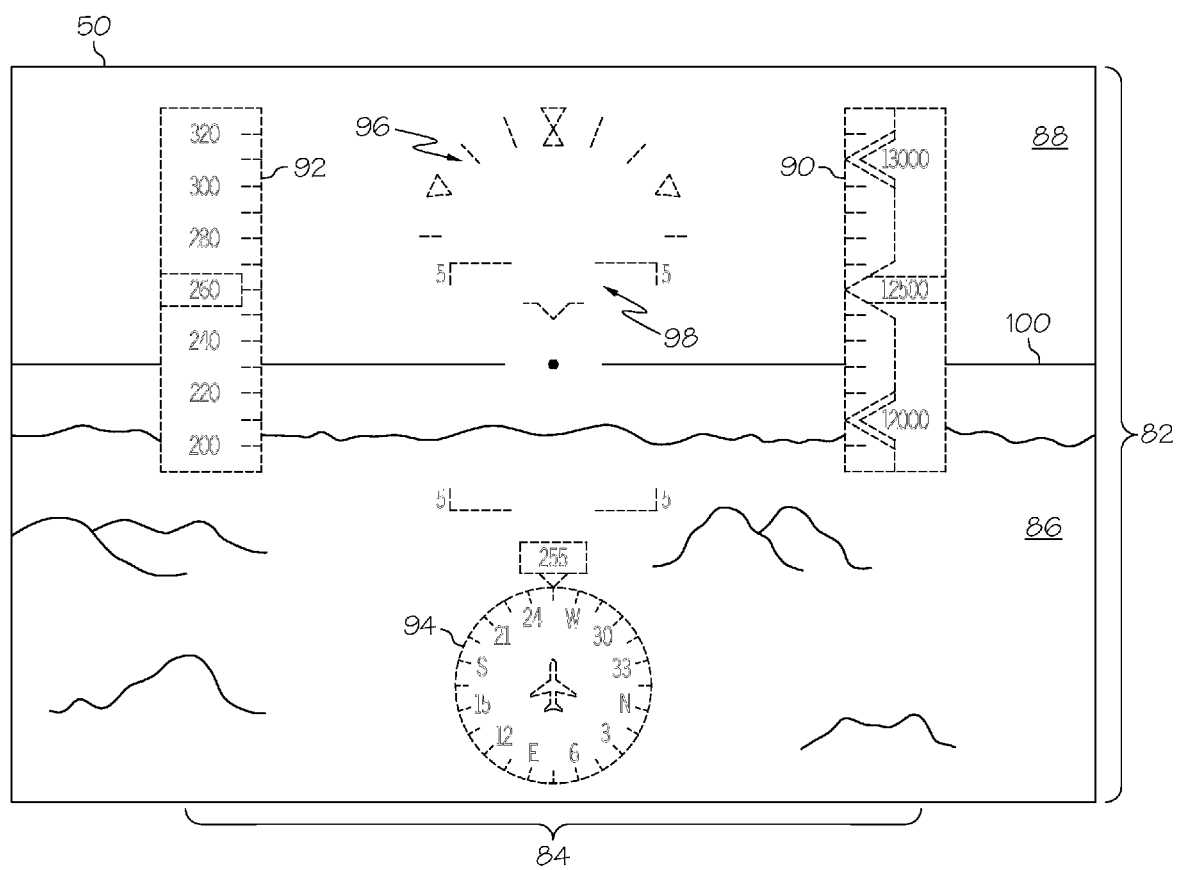
FIG. 11 is a plan view of the NTE display with the entire symbology image partially dimmed simultaneously

In one embodiment, when the headset 36 is moved towards and/or through the forward limit 110 or the backward limit 112 (shown in FIG. 2) the entire symbology image 84 (or a portion thereof) is simultaneously dimmed, as shown in FIG. 11. This dimming may occur gradually as the headset 36 and/or the NTE display 50 is moved through the forward and backward limits 110 and 112. For example, as the headset 36 passes through the forward limit 110, the entire symbology image 84 may be dimmed a first degree (e.g., from 100% luminance to 75% luminance). As the headset 36 continues to be moved out of the visibility range 52, the entire symbology image 84 may be dimmed a second degree (e.g., 75% luminance to 50% luminance), until the symbology image 84 has been completely removed as shown in FIG. 8. The symbology image 84 may similarly be dimmed as the headset 36 passes through the backward limit 110 of the visibility range 52.

In another embodiment, as the headset 36 is moved towards and/or through any of the limits 102, 104, 106, 108, 110, and 112 (FIG. 2), the entire symbology image 84 is simultaneously dimmed as just described. For example, when the headset 36 is moved as shown in FIG. 4, the entire symbology image 84 may be dimmed a first degree (e.g., from 100% luminance to 75% luminance). As the headset 36 continues to be moved out of the visibility range 52, such as shown in FIG. 6, the entire symbology image 84 may be dimmed a second degree (e.g., 75% luminance to 50% luminance), until the symbology image 84 has been completely removed as shown in FIG. 8.

One advantage of the method and system described above is that the pilot is, in effect, is able to "look around" the symbology displayed on the NTE display by moving his or her head. Thus, the pilot may view the exterior of the aircraft with a completely unobstructed view. Another advantage is that the pilot is given the ability to disable the symbology on the NTE display without manually actuating any user input devices on the flight deck (e.g., such as when the pilot wishes to quickly glance at one of the heads-down displays on the flight deck).

While the above embodiments have been described in the context of relatively straightforward defined visibility ranges, it should be understood that the general case of the present invention allows each portion of the displayed image to be subject to its own defined visibility range which is a generalized function of all applicable degrees of freedom. Each defined visibility range may be made up of multiple constituent defined visibility ranges which may or may not intersect. As an exemplary embodiment, the defined visibility range depicted in FIG. 2 may have a central portion which is excluded, where the nominal design eye position for an operator wearing the NTE display 50 provides a clear and unobstructed view of the outside scene, but slight motion away from the nominal position in any direction will cause the symbology overlay to be displayed. In another embodiment, the direction of movement of dashed line 118 in FIGS. 5, 7, and 8 may be reversed, depending upon the tracked position along the y-axis. In yet another embodiment, the luminance of the display may be changed abruptly with orientation about the x-axis shown in FIG. 2, providing an uncluttered outside view when the display is in a first orientation (e.g., centered on the horizon line) but displays the full symbology when the user's head is tipped forward and/or backward a small amount (e.g. 3-5 degrees), which may be less than the instantaneous vertical field of view of the NTE display 50.

The symbology image 84 of FIG. 3 is also understood to not be limited to conventional symbology, and may also comprise or include such imagery as sensor images, synthetic images, library images, conformal images or any other content such as might obscure or distract from the image 82 of FIG. 3.

Other embodiments may utilize the method and system described above on vehicles other than aircraft, such as land vehicles and watercraft. The method and system may also be used on unmanned vehicles, in which the operational range limit corresponds to station where a user remotely controls the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating a vehicular near-to-eye (NTE) display screen operable within an operational range limit, the method comprising:

rendering an image on the NTE display screen within a predefined visibility range, the predefined visibility range being within the operational range limit; and dynamically adjusting a luminance of at least a portion of the image based upon the position of the NTE display, wherein a luminance of at least a portion of the image is dynamically reduced in response to at least a portion of the NTE display screen being moved from inside the predefined visibility range to outside of the predefined visibility range while remaining within the operational range limit, and a luminance of at least a portion of the image is dynamically increased in response to at least a portion of the NTE display screen being moved from outside the predefined visibility range to inside of the predefined visibility range.

2. The method of claim 1, wherein the at least a portion of the image is the entire image.

3. The method of claim 1, wherein the operational range limit and the predefined visibility range each comprise at least one of a spatial component and an angular component.

4. The method of claim 3, wherein the NTE display screen is moveable and has at least three degrees of freedom within the predefined visibility range.

5. The method of claim 4, wherein the predefined visibility range comprises first and second limits on opposing extrema of each of the at least three degrees of freedom.

6. The method of claim 5, wherein the image has first and second opposing sides and when the NTE display screen is moved beyond the first limit of one of the degrees of freedom, the at least a portion of the image is adjacent to the first side of the image, and when the NTE display screen is moved beyond the second limit of the one of the degrees of freedom, the at least a portion of the image is adjacent to the second side of the image.

7. The method of claim 6, wherein the at least a portion is a first portion of the image and further comprising retaining the luminance of a second portion of the image when the NTE display screen is moved outside of the predefined visibility range.

8. The method of claim 7, further comprising:
increasing the first portion of the image as the NTE display screen is moved farther beyond the respective limit of the one of the degrees of freedom; and
decreasing the second portion of the image as the NTE display screen is moved farther beyond the respective limit of the one of the degrees of freedom.

9. The method of claim 8, wherein the predefined visibility range comprises a spatial component and an angular component.

10. The method of claim 9, wherein the NTE display screen is substantially transparent.

11. A method for operating a near-to-eye (NTE) display screen operable within an operational range limit on-board an aircraft, the method comprising:
causing a first image to be rendered on the NTE display screen within a predefined visibility range, wherein the first image is at least representative of a field of view of a user on-board the aircraft and the predefined visibility range is within the operational range limit and a function of at least three degrees of freedom;
rendering a second image over the first image on the NTE display screen; and
dynamically adjusting a luminance of at least a portion of the second image based upon a position of the NTE display, wherein a luminance of at least a portion of the second image is dynamically reduced in response to the NTE display screen being moved from inside the predefined visibility range to outside of the predefined visibility range while remaining within the operational range limit, and a luminance of at least a portion of the second image is dynamically increased in response to at least a portion of the NTE display screen being moved from outside the predefined visibility range to inside of the predefined visibility range.

12. The method of claim 11, wherein the second image comprises symbology indicative of a current state of the aircraft.

13. The method of claim 12, wherein the predefined visibility range comprises first and second limits on opposing extrema of each of the at least three degrees of freedom.

14. The method of claim 13, wherein the second image has first and second opposing sides and when the NTE display screen is moved beyond the first limit of one of the degrees of freedom, the at least a portion of the image is adjacent to the first side of the second image, and when the NTE display screen is moved beyond the second limit of the one of the degrees of freedom, the at least a portion of the second image is adjacent to the second side of the image.

15. The method of claim 14, wherein the at least a portion of the second image is a first portion of the second image and further comprising:
retaining the luminance of a second portion of the second image when the NTE display screen is moved outside of the predefined visibility range;
increasing the first portion of the second image as the NTE display screen is moved farther beyond the respective limit of the one of the degrees of freedom; and
decreasing the second portion of the second image as the NTE display screen is moved farther beyond the respective limit of the one of the degrees of freedom.

16. An avionics system comprising:
a headset configured to be worn on a head of a user, the headset comprising a frame and a near-to-eye (NTE) display adjustably coupled to the frame to be positioned proximate to an eye of the user, the NTE display being operable within an operational range limit on-board an aircraft;
a tracking system configured to detect at least one of a position and an angular orientation of the NTE display; and
a processor in operable communication with the NTE display and the tracking system, the processor being configured to:
render an image on the NTE display screen within the predefined visibility range, the predefined visibility range being within the operational range limit; and
dynamically adjusting a luminance of at least a portion of the image based upon a position of the NTE display, wherein a luminance of at least a portion of the image is dynamically reduced in response to the NTE display screen being moved from inside the predefined visibility range to outside of the predefined visibility range while remaining within the operational range limit, and a luminance of at least a portion of the image is dynamically increased in response to at least a portion of the NTE display screen being moved from outside the predefined visibility range to inside of the predefined visibility range.

17. The avionics system of claim 16, wherein the operational range limit and the predefined visibility range each comprise at least one of a spatial component and an angular component.

18. The avionics system of claim 17, wherein the tracking system is further configured to detect the at least one of a position and an angular orientation of the NTE display screen amongst at least three degrees of freedom within the predefined visibility range, and the predefined visibility range comprises first and second limits on opposing extrema of each of the at least three degrees of freedom.

19. The avionics system of claim 18, wherein the image has first and second opposing sides and the processor further configured such that when the NTE display screen is moved beyond the first limit of one of the degrees of freedom, the at least a portion of the image is adjacent to the first side of the image, and when the NTE display screen is moved beyond the second limit of the one of the degrees of freedom, the at least a portion of the image is adjacent to the second side of the image.

20. The avionics system of claim 19, wherein the at least a portion is a first portion of the image and the processor is further configured to:
   retain the luminance of a second portion of the image when the NTE display screen is moved outside of the pre-defined visibility range;
   increase the first portion of the image as the NTE display screen is moved farther beyond the respective limit of the one of the degrees of freedom; and
   decrease the second portion of the image as the NTE display screen is moved farther beyond the respective limit of the one of the degrees of freedom.

* * * * *